Patented Nov. 6, 1951

2,573,953

UNITED STATES PATENT OFFICE 2,573,953

PEST CONTROL USING A SULFURIZED HALOGENATED PETROLEUM DISTILLATE

John P. Buckmann, Redondo Beach, Calif., assignor to Union Oil Company of California, Los Angeles, Calif., a corporation of California No Drawing. Application November 1, 1948,
Serial No. 57,831

10 Claims. (Cl. 167—28)

This invention relates to pest control, and in particular concerns improved methods and compositions for arresting or preventing the growth of insects and other organisms which are economically and physiologically undesirable. More particularly, it relates to pest control methods and compositions involving the use of sulfurized halogenated petroleum distillates as toxic agents. The term "pest control" is employed herein as a generic expression including such terms as insecticide, fungicide, aphicide, vermicide, bactericide, larvicide, pesticide, and the like.

The sulfurized halogenated petroleum distillates which are employed as active agents in the control of pests according to the invention are obtained by reaction between a halogenated petroleum distillate, such as chlorinated kerosene, and an alkali-metal polysulfide or equivalent mixture of an alkali-metal sulfide and free sulfur. These products vary in physical characteristics from light-colored mobile liquids to dark high-boiling viscous oils depending upon the nature of the petroleum distillate and the degree to which it has been halogenated and sulfurized. Their exact chemical structure can not be stated definitely since the petroleum distillates from which they are derived are complex mixtures comprising varying amounts of aliphatic, naphthenic, and aromatic hydrocarbons. Moreover, the exact mechanism of the reaction by which they are formed is not fully understood, although it appears to involve for the most part the substitution of sulfur for two halogen atoms in the halogenated petroleum distillate hydrocarbon molecule. The products can not accurately be described as hydrocarbon sulfides, however, since they invariably contain appreciable amounts of halogen, e. g., from about 0.5 to about 15 per cent by weight. Usually their sulfur content ranges from about 5 to about 30 per cent by weight.

The reaction for the formation of the sulfurized halogenated petroleum distillates is conveniently carried out at slightly elevated temperatures, e. g., 50°–150° C. in the presence of an inert reaction solvent such as ethanol. In cases where the reaction temperature is above the boiling point of the halogenated petroleum distillate reactant or the reaction solvent it is necessary to effect the reaction in a closed vessel under autogenic pressure. Upon completion of the reaction, the product is usually washed several times with water to remove alkali-metal halide and other water-soluble impurities, and is dried by topping in a vacuum evaporator or still. If desired, it may be distilled into fractions of varying viscosity and sulfur content.

The following examples will illustrate the preparation of typical sulfurized halogenated petroleum distillates suitable for use in the control of pests in accordance with the invention, but are not to be construed as limiting the same. All proportions are given as parts by weight.

Example I

Approximately 133 pounds of chlorinated kerosene, 79 pounds of flake sodium sulfide (60%), 19.5 pounds of powdered sulfur, and 120 pounds of n-propanol were charged into an 80-gallon stainless steel reactor fitted with an agitator, steam-heating coils and cold-water reflux coils. The chlorinated kerosene reactant was a product obtained by the direct addition of chlorine to kerosene at a temperature of about 80°–95° C. in the presence of light, and contained about 13.3 per cent by weight of chlorine. The reaction mixture was heated with stirring at a temperature of about 85°–100° C. for 26 hours, after which approximately 330 pounds of water were added. The diluted reaction product was allowed to stand overnight at a temperature of about 40°–65° C., after which the aqueous layer was drawn off and discarded. The organic layer was washed three times with 330-pound portions of water, and was then topped in a steam-heated rising film evaporator at a pressure of 6–12 mm. whereby there was removed about two pounds of water and about six pounds of kerosene. The product was then cooled and filtered through clay. The finished product consisted of approximately 125 pounds of sulfurized chlorinated kerosene in the form of a clear dark-brown mobile liquid having a pleasant terpene-like odor. It had a sulfur content of about 6.7 per cent by weight, a chlorine content of about 2.2 per cent by weight, and a specific gravity of about 0.895.

Example II

Approximately 278 parts of chlorinated kerosene containing 36.7 per cent by weight of chlorine, 860 parts of sodium sulfide monohydrate, 110 parts of powdered sulfur, and 1580 parts of ethanol were charged into an autoclave equipped with an agitator and steam coils. This mixture was heated with stirring at about 120°–130° C. for 7 hours under an autogenic pressure of about 50 lbs. per square inch. The crude reaction product was diluted with an approximately equal volume of water and allowed to separate into layers. The organic layer was extracted with solvent naphtha, and the extract was dried over calcium chloride. After filtering and removal of the solvent naphtha by distillation to about 150° C., there was obtained 132 parts of sulfurized chlorinated kerosene containing 18.2 per cent by weight of sulfur and 2.9 per cent by weight of chlorine. This product was a dark-brown slightly viscous liquid having a slight odor resembling that of sulfurized terpenes.

*Example III*

Four portions of chlorinated kerosene having a chlorine content of about 14.2 per cent by weight were reacted as described in Example I with a calculated 30 per cent excess of sodium sulfide, sodium trisulfide, sodium tetrasulfide, and sodium pentasulfide, respectively. The sodium polysulfides were prepared by mixing 60 per cent flake sodium sulfide with the appropriate amount of free sulfur. In each instance the reaction was carried out with stirring at reflux temperature in the presence of n-propanol as an inert reaction solvent. The crude products were washed with water several times and then air-blown at steam-bath temperature. The following products were obtained.

| Sulfide Reactant | Product | | |
|---|---|---|---|
| | Appearance | Per Cent S | Per Cent Cl |
| Sodium Monosulfide | Clear brown mobile liquid | 3.8 | 4.5 |
| Sodium Trisulfide | Dark brown fluid | 10.0 | 2.5 |
| Sodium Tetrasulfide | Very dark brown oil | 18.9 | 2.5 |
| Sodium Pentasulfide | Very dark brown viscous oil | 26.2 | 2.5 |

*Example IV*

A petroleum distillate naphtha fraction (boiling range=202°–284° F.) was chlorinated to a chlorine content of about 30.4 per cent by weight by the direct addition of chlorine at a temperature of about 40°–60° C. under the catalytic influence of actinic light. This product was then mixed with an equal volume of n-propanol, and a 30 per cent molecular excess of sodium disulfide, and the mixture was heated at reflux temperature for 3 hours. The crude product was washed with water and topped to 140° C. by distillation, whereby there was obtained a sulfurized chlorinated naphtha product containing 15.6 per cent by weight of sulfur and 7.4 per cent by weight of chlorine.

*Example V*

A distillate oil fraction (boiling range=546°–740° F.) was chlorinated to a chlorine content of 15.1 per cent by weight, and thereafter reacted with sodium disulfide as described in Example IV. The sulfurized chlorinated oil product was a dark-brown oil containing 5.9 per cent by weight of sulfur and 3.4 per cent by weight of chlorine.

*Example VI*

A light petroleum oil fraction (viscosity at 100° F.=59 SUS) was chlorinated to a chlorine content of 21.1 per cent by weight and thereafter reacted with sodium disulfide as described in Example IV. The sulfurized chlorinated oil product was a dark-brown viscous oil containing 9.8 per cent by weight of sulfur and 5.4 per cent by weight of chlorine.

While the preceding examples illustrate the sulfurization of various chlorinated petroleum distillates, the same procedures are applicable to brominated and iodinated products. The halogen content of the halogenated petroleum distillate reactant may be varied over wide limits depending upon the sulfur content desired in the sulfurized product. Usually, however, it is preferable that the halogenated petroleum distillate contain from about 1 to about 4 atoms of halogen per average petroleum distillate molecule. When chlorinated kerosene is employed as the halogenated petroleum distillate reactant it is preferred to use a chlorinated kerosene containing from about 10 to about 50 per cent by weight of chlorine. The alkali-metal polysulfide reactant is preferably employed in an amount somewhat in excess of that required to replace all of the halogen of the halogenated petroleum distillate. An excess of about 30 per cent by weight is usually satisfactory. If desired, the time required for completion of the reaction may be shortened by employing somewhat higher reaction temperatures, e. g., 100°–200° C. When employing such higher reaction temperatures the necessity of operating under superatmospheric pressure may be obviated through the use of high-boiling reaction solvents, e. g., butanol, ethylene glycol, etc. Upon completion of the reaction, the crude product is preferably washed with water several times to remove alkali-metal halide and then topped to 125°–175° C. by distillation. If desired, however, it may be extracted with a suitable organic solvent, and the extract freed of solvent by distillation.

The sulfurized halogenated petroleum distillates may be employed in various ways in the control of pest organisms. Inasmuch as these products are relatively non-volatile liquids they are well suited for outdoor use in orchard or garden spray compositions. Such compositions may take the form of a simple solution of the sulfurized halogenated petroleum distillate in a non-phytotoxic solvent such as spray oil. More usually, however, the spray compositions are formulated as aqueous emulsions or dispersions which may contain a wide variety of emulsifying, wetting, or dispersing agents, sticking agents, spreaders, and secondary toxic agents, in addition to the sulfurized halogenated petroleum distillate. Any of the known procedures for preparing such compositions may be employed, and any of the various known wetting agents, detergents, spreaders, etc. may be employed in their formulation. In accordance with usual practice, the compositions are conveniently prepared and marketed as concentrates which can be admixed with water at any desired time to obtain the ultimate spray compositions. Such a concentrate composition may comprise, for example, sulfurized chlorinated kerosene prepared as described in Example I and 0.10 per cent by weight of the sodium salts of mixed sulfated higher alcohols. Upon mixing one part by weight of this concentrate with 99 parts by weight of water, there is obtained an effective emulsion-type insecticidal spray of 1 per cent concentration.

The sulfurized halogenated petroleum distillates of the present invention may also be absorbed on active or inert carriers, e. g., talc, starch, aluminum silicate, walnut shell flour, etc., to form insecticidal dusting compositions which may also contain other toxic agents such as sulfur, DDT, pyrethrins, nicotine derivatives, etc. Similarly, they may be employed in household sprays in conjunction with other toxic agents such as pyrethrins or rotenone, synergists, active or inert solvents, aerosols, etc. They may also be employed as soil fumigants and the like.

The following examples will illustrate the use of different sulfurized halogenated petroleum distillates in the control of various pest organisms in various ways, but are not to be construed as limiting the invention.

Example VII

An ovicidal spray composition was prepared by dispersing 0.5 gallon of sulfurized chlorinated kerosene (prepared as described in Example I and containing 5.5% sulfur and 1.8% chlorine) in 100 gallons of water to which had been added 4 ounces of powdered blood albumen. The latter ingredient served as a dispersing agent or spreader. The resulting dispersion was sprayed on ripe Valencia oranges which were infested with the eggs of the citrus red mite (*Paratetranychus citri*). Examination of the fruit six days after treatment showed 100 per cent of the eggs to be unhatched. Control fruit which had been sprayed with the aqueous spreader alone showed an egg mortality of only 10 per cent.

Example VIII

Each of the four sulfurized chlorinated kerosene products prepared in Example 3 was tested for phytotoxicity on tomato, squash, and chard plants. In each instance, a healthy young plant of each type was thoroughly sprayed with a one per cent by weight aqueous dispersion of the sulfurized chlorinated kerosene. Seven days after treatment the plants were examined and the following conditions noted:

| Product Tested | Plant Condition | | |
|---|---|---|---|
| | Tomato | Squash | Chard |
| Sulfurized Chlorinated Kerosene, 3.8% S; 4.5% Cl. | No injury | No injury | No injury. |
| Sulfurized Chlorinated Kerosene, 10.0% S; 2.5% Cl. | Slight injury, no necrosis. | ___do___ | Do. |
| Sulfurized Chlorinated Kerosene, 18.9% S; 2.5% Cl. | No injury | ___do___ | Do. |
| Sulfurized Chlorinated Kerosene, 26.2% S; 2.5% Cl. | Slight injury, no necrosis. | | Do. |

Example IX

The sulfurized chlorinated kerosene product containing 26.2 per cent by weight of sulfur and 2.5 per cent by weight of chlorine prepared in Example III was tested for its fungistatic action on *Sclerotinia fructicola*. In carrying out the test, the toxic agent was dispersed in a dilute sugar solution at a concentration twice that desired for the test. The dispersion was then mixed with an equal volume of a nutrient broth culture of the test organism spores. After 24 hours the culture was examined under the microscope and an actual count made to determine the proportion of germinating spores.

| Concentration | Condition of Organism |
|---|---|
| 0.2 | No germination of spores, complete inhibition. |
| 0.1 | Do. |
| 0.05 | 1-5 per cent of spores germinating. |
| 0.025 | 10-25 per cent of spores germinating. |

Example X

The following table presents the results obtained in full scale field tests of a sulfurized chlorinated kerosene product prepared as described in Example I and containing 5.5 per cent by weight of sulfur and 1.2 per cent by weight of chlorine. Selected plots of mature citrus trees infested with the citrus red mite (*Paratetranychus citri*) were thoroughly sprayed with the test compositions employing a 100-gallon Hardie power sprayer. The test sprays were tank mixed in the indicated proportions employing 4 ounces of powdered blood albumen spreader per 100 gallons of water. After the indicated lapse of time given in the table, 10 leaves were picked from each tree in the plot and examined for the number of live mites.

Table

| Citrus Variety | No. of Trees in Plot | Concentration of Active Ingredient in Spray, Per Cent by Volume | Average No. of Live Mites per Leaf After (days) | | | | | | |
|---|---|---|---|---|---|---|---|---|---|
| | | | 7 | 14 | 35 | 69 | 92 | 126 | 178 |
| Lemon | 6 | 0.5 | 5.12 | 2.63 | 0.97 | 0.65 | 0.20 | 0.62 | 1.87 |
| Do | 6 | 0.75 | 4.20 | 0.67 | 0.38 | 0.13 | 0.00 | 0.25 | 0.72 |
| Do | 6 | 1.0 | 0.70 | 0.66 | 0.22 | 0.16 | 0.05 | 0.17 | 0.46 |
| Do | 6 | 1.25 | 0.07 | 0.33 | 0.10 | 0.00 | 0.00 | 0.10 | 0.10 |
| | | | 13 | 54 | 95 | | | | |
| Lime | 20 | 0.5 | 0.2 | 0.37 | 0.08 | | | | |
| Do | 20 | 1.0 | 0.2 | 0.37 | 0.02 | | | | |
| | | | 35 | 79 | | | | | |
| Valencia Orange | 12 | 0.25 | 5.28 | 1.88 | | | | | |
| Do | 11 | 0.33 | 0.83 | 0.52 | | | | | |
| Do | 14 | 0.50 | 1.98 | 1.38 | | | | | 4 |
| Do | 12 | 0.66 | 0.18 | 0.21 | | | | | |
| Do | 14 | 0.75 | 0.88 | 0.54 | | | | | |
| Do | 14 | 1.00 | 0.45 | 0.29 | | | | | |

Example XI

An aqueous spray composition was prepared by dispersing 2 parts of the sulfurized chlorinated kerosene product prepared in Example II in 100 parts of water with the aid of a very small quantity of powdered blood albumen. Grapefruit infested with mature (40 days old) citrus red scale (*Aonidiella aurantii*) were sprayed with this composition. Three weeks after the treatment examination of the fruit showed a 100 per cent mortality of the scale.

Example XII

A sample of the sulfurized chlorinated kerosene product obtained in Example I was fractionally distilled under 5 mm. vacuum to obtain a number of fractions of varying sulfur and chlorine content. A fraction distilling at 185°–210° C. and containing 9.9 per cent by weight of sulfur and 4.3 per cent by weight of chlorine was tested for toxicity against the confused flour beetle (*Tribolium confusum*) as follows: Approximately 0.2 ml. of the liquid fraction was placed in a small open Petri dish placed inside a closed culture dish having a capacity of about 850 cc. Twelve flour beetles were placed in the culture dish, but outside the Petri dish, so as to be exposed only to the diffused vapors of the test material. After 48 hours of such exposure in the closed dish, the dish was opened and a revival period of 24 hours allowed to elapse. A count of the dead beetles showed a 50 per cent mortality as compared to a 1 per cent control mortality. In a second test in which a 72-hour exposure time was permitted, the mortality was 97 per cent as compared with a control mortality of less than 2 per cent.

Example XIII

The sulfurized chlorinated petroleum hydrocarbon products described in Examples IV and V, above, were tested as contact insecticides against the milkweed bug (*Oncopeltus fasciatus*). In each case, 5 parts by weight of the toxic agent were mixed with 95 parts by weight of wheat flour, and the resulting mixture was placed in a Petri dish along with a number of the milkweed bugs. The dish was then gently shaken to insure complete contact between the bugs and the insecticide, after which the bugs were removed and placed in a clean Petri dish for observation. Counts were made at 3-, 6- and 24-hour intervals:

| Toxic Agent | Per Cent Dead After— | | |
|---|---|---|---|
| | 3 hrs. | 6 hrs. | 24 hrs. |
| Sulfurized chlorinated naphtha from Example IV | 93 | 93 | 100 |
| Sulfurized chlorinated light oil from Example V | 73 | 77 | 87 |

The concentration in which the sulfurized halogenated petroleum distillate products are employed in pest control compositions varies widely depending upon a number of factors, including the particular sulfurized halogenated petroleum distillate and the sulfur and chlorine content thereof, the type of composition in which it is employed, the type of organism to be combatted and the conditions under which the composition is to be used. In general, however, when employed in aqueous emulsion or dispersion form as an orchard or garden spray, it is preferable that the composition contain from about 0.25 to about 5.0 per cent by weight of the active agent. Such compositions usually comprise a small amount, e. g., 0.001 to 0.5 per cent by weight, of a wetting or dispersing agent which not only acts to secure homogeneous dispersion of the sulfurized halogenated petroleum distillate in the water but also serves to promote good contact between the spray and the foliage or the like being treated. In other types of compositions, for example in dry dusting compositions wherein the sulfurized halogenated petroleum distillate is absorbed on an inert dry carrier, the active agent is usually employed in somewhat higher concentrations, e. g., 5.0 to 25 or more per cent by weight. For soil fumigation and the like, it may be desirable to employ the active agent at full strength or as a relatively concentrated solution in a suitable solvent.

Other modes of applying the principle of my invention may be employed instead of those explained, change being made as regards the methods or materials disclosed provided the steps or compositions stated by any of the following claims, or the equivalent of such stated steps or compositions, be employed.

I, therefore, particularly point out and distinctly claim as my invention:

1. The method of protecting materials from attack by pest organisms which comprises applying to the surface of said material a toxic amount of a pest control composition containing as an essential active ingredient a sulfurized halogenated petroleum distillate containing from about 0.5 to about 15 per cent by weight of chemically bound halogen and from about 5 to about 30 per cent by weight of chemically bound sulfur, and prepared by reacting a halogenated petroleum distillate containing from about 1 to about 4 atoms of halogen per average petroleum distillate molecule with an agent selected from the class consisting of alkali-metal polysulfides and mixtures of alkali-metal sulfides with free sulfur at a temperature between about 50° C. and about 200° C.

2. The method of claim 1 wherein the pest control composition comprises an aqueous dispersion containing from about 0.25 to about 5.0 per cent of the said active ingredient.

3. The method of claim 1 wherein the pest control composition consists of an inert dry carrier material having the said active ingredient absorbed thereon.

4. The method of claim 1 wherein the active ingredient is a sulfurized chlorinated petroleum distillate containing from about 0.5 to about 15 per cent by weight of chemically bound chlorine and from about 5 to about 30 per cent by weight of chemically bound sulfur, and is prepared by reaction between a chlorinated petroleum distillate containing from about 1 to about 4 atoms of halogen per average petroleum distillate molecule and an agent selected from the class consisting of alkali-metal polysulfides and mixtures of alkali-metal sulfides with free sulfur at a temperature between about 50° C. and about 200° C.

5. The method of claim 1 wherein the active ingredient is sulfurized chlorinated kerosene containing from about 0.5 to about 15 per cent by weight of chemically bound chlorine and from about 5 to about 30 per cent by weight of chemically bound sulfur, and is prepared by reacting chlorinated kerosene containing from about 10 to about 50 per cent by weight of chlorine with an agent selected from the class consisting of sodium polysulfide and mixtures of sodium sulfide with free sulfur at a temperature between about 50° C. and about 200° C.

6. The method of claim 1 wherein the active ingredient is sulfurized chlorinated kerosene containing from about 0.5 to about 15 per cent by weight of chemically bound chlorine and from about 5 to about 30 per cent by weight of chemically bound sulfur, and is prepared by reacting chlorinated kerosene containing from about 10 to about 50 per cent by weight of chlorine with sodium polysulfide in an amount in excess of that theoretically required to replace all of the chlorine of the chlorinated kerosene in the presence of an inert reaction solvent at a temperature between about 50° and about 200° C.

7. The method of killing undesirable pest organisms which comprises dispersing in water from about 0.25 to about 5.0 per cent by weight of a sulfurized chlorinated kerosene, and spraying the resulting liquid composition so as to bring the sulfurized chlorinated kerosene into contact with said pest organisms, said sulfurized chlorinated kerosene containing from about 0.5 to about 15 per cent by weight of chemically bound chlorine and from about 5 to about 30 per cent by weight of chemically bound sulfur and being prepared by reacting a chlorinated kerosene containing from about 1 to about 4 atoms of chlorine per average kerosene molecule with sodium polysulfide in an amount in excess of that theoretically required to replace all of the chlorine of the chlorinated kerosene in the presence of an inert reaction solvent at a temperature between about 50° and about 200° C.

8. The method of killing undesirable pest organisms which comprises dispersing in water from about 0.25 to about 5 per cent by weight of a sulfurized halogenated petroleum distillate, and spraying the resulting liquid composition so as to bring the sulfurized halogenated petroleum distillate into contact with said pest organisms, said sulfurized halogenated petroleum distillate containing from about 0.5 to about 15 per cent by weight of chemically bound halogen and from about 5 to about 30 per cent by weight of chemically bound sulfur and being prepared by reacting a halogenated petroleum distillate containing from about 1 to about 4 atoms of halogen per average petroleum distillate molecule with an agent selected from the class consisting of alkali-metal polysulfides and mixtures of alkali-metal sulfides with free sulfur at a temperature between about 50° and about 200° C.

9. A pest control composition essentially comprising an aqueous dispersion containing from about 0.25 to about 5 per cent by weight of a sulfurized halogenated petroleum distillate and a small amount of a dispersing agent adapted to maintain said sulfurized halogenated petroleum distillate homogeneously dispersed therein, said sulfurized halogenated petroleum distillate containing from about 0.5 to about 15 per cent by weight of chemically bound halogen and from about 5 to about 30 per cent by weight of chemically bound sulfur and being prepared by reacting a halogenated petroleum distillate containing from about 1 to about 4 atoms of halogen per average petroleum distillate molecule with an agent selected from the class consisting of alkali-metal polysulfides and mixtures of alkali-metal sulfides with free sulfur at a temperature between about 50° and about 200° C.

10. A pest control composition essentially comprising an aqueous dispersion containing from about 0.25 to about 5 per cent by weight of a sulfurized chlorinated kerosene and a small amount of a dispersing agent adapted to maintain said sulfurized chlorinated kerosene homogeneously dispersed therein, said sulfurized chlorinated kerosene containing from about 0.5 to about 15 per cent by weight of chemically bound chlorine and from about 5 to about 30 per cent by weight of chemically bound sulfur and being prepared by reacting chlorinated kerosene from about 10 to about 50 per cent by weight of chlorine with sodium polysulfide in an amount in excess of that theoretically required to replace all of the chlorine of the chlorinated kerosene in the presence of an inert reaction solvent at a temperature between about 50° and about 200° C.

JOHN P. BUCKMANN.

REFERENCES CITED

The following references are of record in the file of this patent:

UNITED STATES PATENTS

| Number | Name | Date |
|---|---|---|
| 2,197,800 | Henke et al. | Apr. 23, 1940 |
| 2,313,611 | Abramowitz et al. | Mar. 9, 1945 |
| 2,405,482 | Zimmer et al. | Aug. 6, 1946 |